United States Patent [19]

Mayhew et al.

[11] 4,182,201

[45] Jan. 8, 1980

[54] DIFFERENTIAL WITH FLOATING PINION PIN

[75] Inventors: Roger D. Mayhew, Fredonia, Wis.; Richard J. Chalmers, Champlin, Minn.

[73] Assignee: FMC Corporation, San Jose, Calif.

[21] Appl. No.: 820,990

[22] Filed: Aug. 1, 1977

[51] Int. Cl.² .............................................. F16h 1/40
[52] U.S. Cl. .................................... 74/713; 74/710; 403/292; 403/361
[58] Field of Search .............. 242/55.2; 403/361, 292, 403/297, 145, 150, 262; 74/713, 710

[56] References Cited

U.S. PATENT DOCUMENTS

| 941,101 | 11/1908 | Ross | 74/713 |
|---|---|---|---|
| 1,165,915 | 12/1915 | Sparks | 74/695 |
| 1,445,864 | 2/1923 | Alden | 74/713 |
| 1,987,716 | 1/1935 | Skelton | 74/713 |
| 2,492,728 | 12/1949 | Balz | 242/55.2 |
| 2,548,258 | 4/1951 | Griffith | 528/301 |
| 2,720,797 | 10/1955 | Huddleston | 74/713 |
| 3,145,583 | 8/1964 | Frentzel | 74/711 |
| 3,191,447 | 1/1965 | Ollman | 74/713 |
| 3,342,084 | 9/1967 | Randall | 74/711 |
| 3,406,592 | 10/1968 | Von Kaler | 74/713 |
| 3,779,102 | 12/1973 | Pfarrwaller | 74/713 |
| 3,872,741 | 3/1975 | Berchtold | 74/713 |
| 3,894,447 | 7/1975 | Michael | 74/713 |
| 3,974,717 | 8/1976 | Breed | 74/713 |

FOREIGN PATENT DOCUMENTS 580659  9/1946  United Kingdom ............... 242/55.2

*Primary Examiner*—Samuel Scott
*Assistant Examiner*—G. A. Anderson
*Attorney, Agent, or Firm*—A. J. Moore

[57] ABSTRACT

A differential including a driven carrier which rotatably receives a pair of spaced bevel gears secured to axially aligned shafts concentric with the axis of rotation of the carrier. A pair of diametrically opposed slots are formed in the inner surface of the carrier and extend parallel to the carrier axis. A two-piece floating pinion pin having pinions journaled thereon includes generally rectangular feet on opposite ends thereof slidably received in the slots and defining flats that are longer than the pin diameter and which slidably engage the sides of the slots thereby preventing rotation of the pin relative to the carrier while allowing the axis of each pinion to shift longitudinally of the slot to maintain the axis of each pinion centered between the engaged portions of the bevel gears. Full bearing engagement of the flats with the sides of the slots is assured during normal operation by a spring which urges the feet of the pinion pin fully into their associated slots thereby compensating for tolerance build up axially of the pinion pin, and by the longer length of the flats which compensates for tolerance buildups transversely of the pinion pin.

5 Claims, 7 Drawing Figures

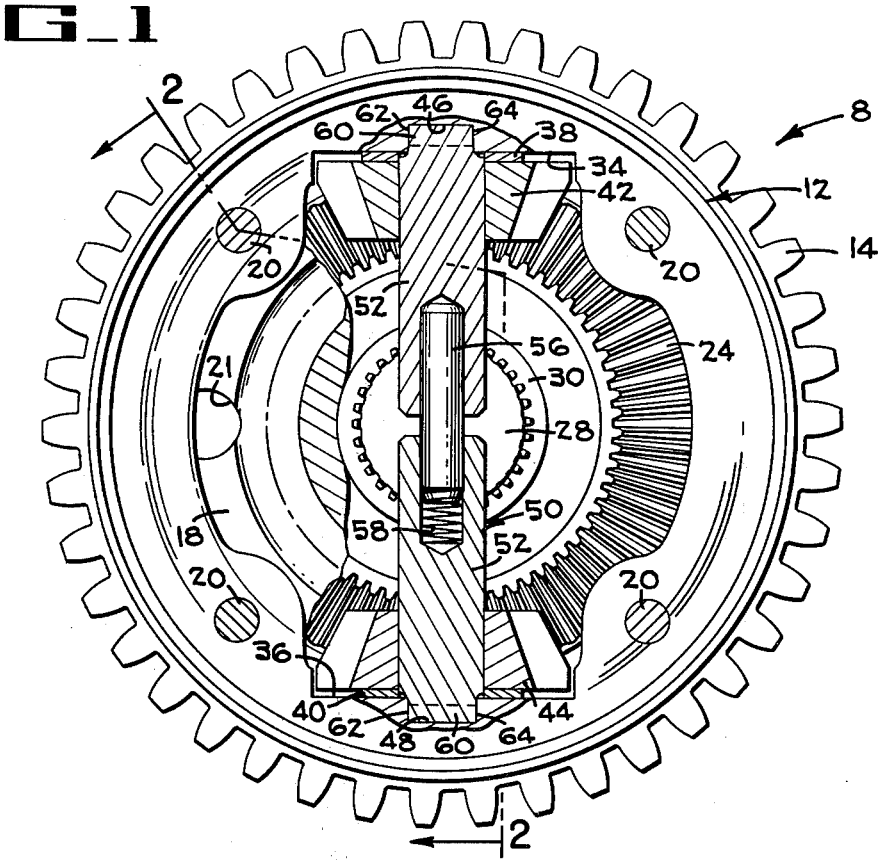

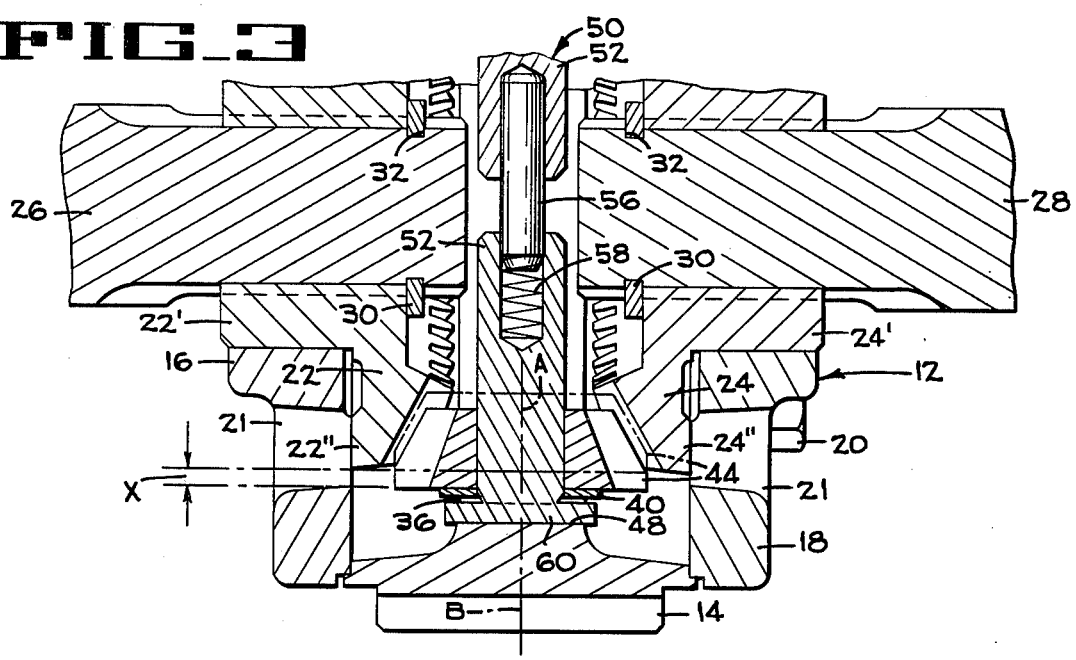
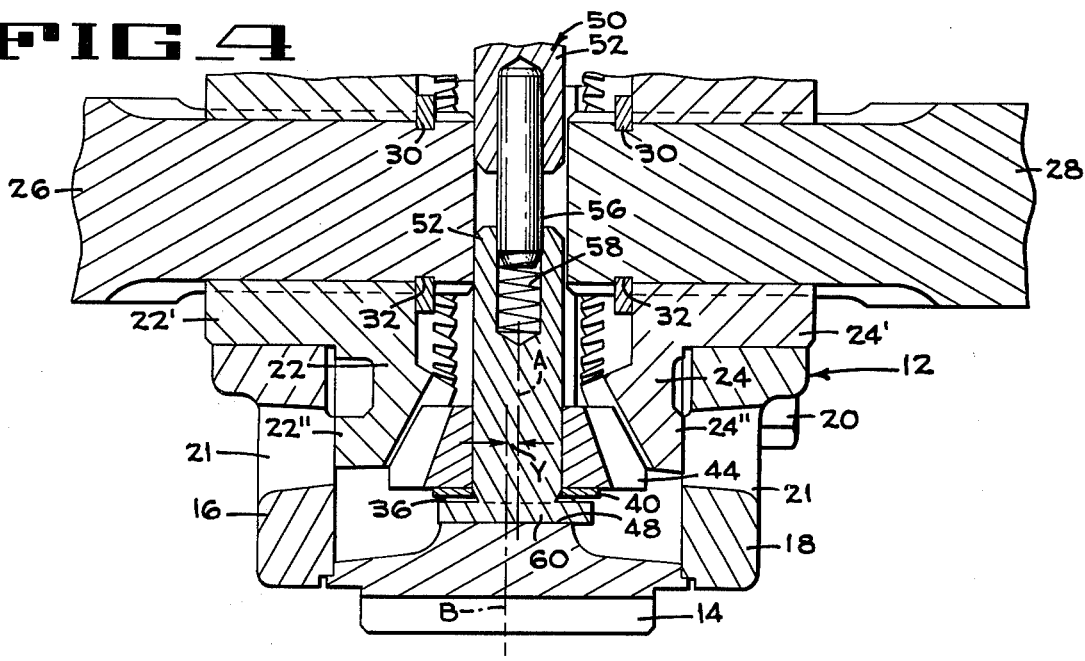
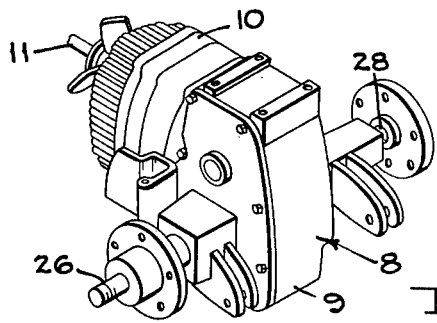
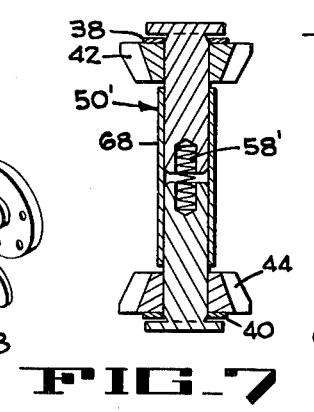
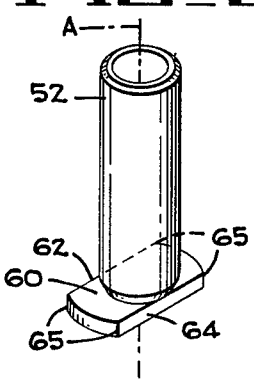

DIFFERENTIAL WITH FLOATING PINION PIN

BACKGROUND OF THE INVENTION

1. Field of the Invention

This invention pertains to differentials and more particularly relates to a floating pinion pin type differential.

2. Description of Prior Art

A differential of the type having floating pinion pins is disclosed in U.S. Pat. No. to Pfarrwaller 3,779,102. The patentee discloses a differential having one bevel gear secured to a tubular shaft and the other bevel gear secured to a second shaft journaled within the tubular shaft. The pinions mesh with the bevel gears and are mounted on a yoke having the second shaft extending through an opening in the yoke. The pinions are journaled on threaded studs of the yoke and are held from axial movement relative to the studs by thrust bearings and nuts screwed onto the studs. The outer ends of the studs are provided with flats that are shorter than the diameter of the studs and are slidably received in slots formed in the inner periphery of a ring gear.

The United States Patent to Randall U.S. Pat. No. 3,342,084 does not disclose a floating pinion pin in a differential but instead discloses pinions with elongated or oversized bores which permit the pinions to float relative to the pinion pin and bevel gears thereby compensating for inaccuracies in machining tolerances or the like. The pinion pin is secured to the casing and does not float.

United States Pat. No. 1,445,864 to Alden discloses a differential with a plurality of pinions journaled on spindles of a spider. Flats are formed in the ends of the spindles and ride in slots in the ring gear or carrier so that rotation of the carrier will also rotate the spider. The thrust of Alden's pinions is absorbed by the carrier. It will be noted that the flats formed on the ends of the spindles are shorter than the diameter of the spindles.

In addition to the above patented differentials, applicants' assignee has manufactured a differential for several years which is substantially the same as the subject differential except that the pinion pin was a one-piece cylindrical pin having flats milled in the ends thereof for slidably engaging diametrically opposed slots in the carrier. The length of the flats, however, was shorter than the diameter of the pin, and the flats were not resiliently urged into the slots to assure maximum bearing contact between the flats and the sides of the slots regardless of tolerance stack-ups axially of the pinion pin.

Applicants have determined that premature differential failure has occurred with assignees' prior art differential mentioned above due to failure of the one-piece prior art floating pivot pin with flats that were shorter than the diameter of the pin. The reason for failure of the prior art pin is that the bearing area between the flats on the pin and the sides of the slots were inadequate. Applicants' first recognized that each reversal of one bevel gear relative to the other caused the pinions to rotate about the pinion pin. Even though the pinions rotated in opposite directions, this pinion rotation tended to also rotate the pinion pin, which rotation is prevented by the flats on the pinion pin engaging the sides of the slots. Each reversal of the direction of movement of the pinion pin caused diagonally opposite edges of the short flats of the prior art pin to be subjected to substantial amounts of rotation resisting force including impact forces. These impact loads on the flats, which occurred each time the bevel gears would rotate relative to each other, tended to hammer or forge the edges of the flats into circular configurations.

The rounding of the flats by this forging action is also accelerated by frictional wear between the edges and the sides of the slots when the pin ends slide back and forth in the slots due to variances in the gearing. This sliding action of the free floating pinion pin is due to the fact that the teeth of the two bevel gears do not rotate in truly parallel planes because of slight errors in machining, wear between the relative rotating parts, and other inaccuracies in the gearing.

Another reason for pin wear is that the ends of the one-piece prior art pins are not always fully seated in their slots and thus full bearing contact does not always occur between the flats and the sides of the slots. In this regard batches of pins and batches of carriers are made within prescribed tolerances. When a short pin is assembled in a carrier having the longest permitted distance between the bottom of the slots, it will be apparent that the ends of the one-piece pin can move axially of the pin in the slots thus causing frictional wear and also providing less than maximum bearing surface contact between the flats and the sides of the slots.

SUMMARY OF THE INVENTION

The differential of the present invention includes a floating pinion pin having large feet on the outer ends thereof with flats that are longer than the diameter of the pinion pin. The pinion pin is preferably of two-piece construction with the large feet on the outer end of each piece being resiliently urged into diametrically opposed slots in a carrier that is rigid with the ring gear to assure maximum bearing contact between the sides of the slots and flats formed on the feet.

The use of a pinion pin having feet with flats that are longer than the diameter of the pin provides a much larger bearing surface between the pin and the slots and substantially eliminates the tendency to round the edges of the flats due to repeated reversals of rotation of one bevel gear relative to the other. The longer flats and the resilient means for urging each foot into full engagement with its slot regardless of adverse tolerance build-ups provides a much larger bearing surface which minimizes frictional wear of the pin thus increasing the life of the differential.

BRIEF DESCRIPTION OF THE DRAWINGS

FIG. 1 is a vertical transverse section taken substantially along lines 1—1 of FIG. 2 through the gearing of the preferred embodiment of the differential of the present invention, the differential casing being removed and certain parts being cut away and shown in section.

FIG. 2 is a section taken along lines 2—2 of FIG. 1, a fragment of one wheel drive shaft being shown in full and the other being shown in section.

FIG. 3 is an operational view of the lower portion of the differential of FIG. 1 illustrating at an exaggerated scale a tolerance build up axially of the pinion pin but with the enlarged foot fully seated in its slot.

FIG. 4 is an operational view illustrating at an exaggerated scale a tolerance build up causing the axis of one of the pinions being shifted to the right of a plane normal to the axis of the wheel shafts and passing through the center of the ring gear.

FIG. 5 is a perspective of one of the sections of the pinion pin illustrating the size and shape of the enlarged foot.

FIG. 6 is a perspective of a differential coupled to a hydrostatic transmission for use in a garden tractor or the like.

FIG. 7 illustrates a modified two piece pinion pin which uses a sleeve to maintain the two sections of the pin in axial alignment.

DESCRIPTION OF THE PREFERRED EMBODIMENT

The differential 8 (FIGS. 1, 2 and 6) of the present invention is designed for use in a garden tractor of the type disclosed in U.S. Fieber Pat. No. 3,528,311 which issued on Sept. 15, 1970 and is assigned to the assignee of the present invention. The disclosure of the Fieber patent is incorporated by reference herein primarily for showing a typical environment in which the differential is employed. It will be understood, however, that the differential may be used in other environments.

As shown in FIG. 6, a typical differential 8 includes a casing 9 coupled to a hydrostatic transmission 10 driven by an input shaft 11. A carrier 12 (FIGS. 1 and 2) is disposed within the casing 9 and includes a ring gear 14 rigidly secured to spaced, annular side plates 16 and 18 by capscrews 20. Lubricant in the casing 9 flows within the carrier 12 through holes 21 in the side plates 16 and 18.

A pair of bevel gears 22 and 24 include hubs 22', 24' journaled in the side plates 16 and 18, respectively; and also include flanges 22", 24" which slidably engage the slide plates 16 and 18, respectively, at the interfaces therebetween. The splined hubs 22', 24' receive the splined ends of wheel drive shafts 26 and 28 that are journaled in the casing 9. The shafts 26 and 28 are held from axial outward movement by snap rings 30 fitted in grooves 32 in the shafts. Diametrically opposed pinion receiving flats 34,36 are formed in the ring gear 14 and receive thrust washers 38,40 and bevel pinion gears or pinions 42 and 44, respectively. Diametrically opposed elongated slots 46 and 48 are formed in the flats 34 and 36, respectively, and extend transversely of the ring gear with their long axes extending transversely of and preferably parallel to the axes of the shafts 26 and 28. The diametrically opposed pinions 42 and 44 mesh with the teeth of the bevel gears 22 and 24 with the resulting radially outward thrust acting thereon being resisted by the thrust washers 38,40 which bear against the ring gear flats 34,36, respectively.

As thus far described, the components of the differential 8 including the casing 9 (FIG. 6) are substantially the same as those used in assignee's prior art differential discussed above.

In accordance with the preferred embodiment of the invention a floating pinion pin 50 (FIGS. 1, 2 and 5) having an elongated axis A is provided for rotatably journaling the pinions 42 and 44 about axis A. It will be understood that in differentials assembled from parts that exactly comply with design specifications with no permitted tolerances, the axis of the pinion pin A will lie within the central plane B (FIG. 4) of the ring gear 14.

The floating pinion pin 50 is preferably made in two identical pieces or sections 52, having their inner ends bored to slidably receive a dowel 56 and a compression spring 58. An enlarged foot 60 (FIG. 5) is formed on the outer end of each section 52, and includes flats 62,64 that terminate at edges 65, are longer than the diameter of the pin 50, and are slidably received in the associated slots 46,48. As best shown in FIGS. 2, 3 and 4, the flats 62, 64 are also preferably longer than the slots 46,48 to provide maximum engagement between the flats and the side walls of the slots even if tolerance build up axially of the shafts 26 and 28 (and transversely of the pinion pin 50) is quite large as indicated in FIG. 4.

In operation of the differential, the ring gear 14 (FIGS. 1 and 2), which is coupled to the shaft 11 (FIG. 6) by conventional parts not fully shown, is rotated thereby rotating the entire carrier 12 and pinion pin 50 as a unit about the axis of the shafts 26 and 28. If both shafts 26 and 28 rotate at the same speed, there is no differential action between the bevel gears 22,24 and thus the pinions and bevel gears also rotate as a unit with the carrier 12.

If relative movement occurs between the shafts, then the pinions 42,44 rotate about the axis A of the pinion pin 50. Rotation of each pinion will tend to rotate the pinion pin section upon which it is mounted in the same direction. This rotative force applied to the pinion pin sections is resisted by engagement of the elongated flats or flat faces 62,64 (FIGS. 1 and 5) of the feet 60 with the side walls of the associated slots 46 and 48 (FIG. 1). Because of the substantial length of the flats 62,64, there is little tendency to round the edges 65 (FIG. 5) thereof (or to round the edges of the slot) by impact forces applied thereto upon each reversal of the direction of rotation of the pinion pin 50.

When there is little or no detrimental tolerance built up axially of the pinion pin 50 and transversely of the pinion pin as represented in FIGS. 1 and 2, frictional wear of the flats 62,64 of the enlarged feet 60 within the associated slots will be at a minimum.

When a differential is assembled from components which result in the distance between the bottoms of the slots 46,48 being substantially longer or shorter than the design specifications, then the spring 58 will compensate for such errors in manufacturing. FIG. 3 illustrates a differential with the distance between the bottoms of the slots 46 and 48 being greater than the design distance by a distance represented by tolerance build up X. It is noted that the spring 58 will compensate for this dimensional error by forcing the feet 60 fully into their respective slots 46,48. Thus, no detrimental effect results from such axial tolerance build up.

FIG. 4 illustrates a differential assembled from parts having the same tolerance build up axially of the pinion pin 50 as shown in FIG. 3. In addition, the illustrated portion of the flange 22" of bevel gear 22 is thicker by distance Y than the desired design thickness of the flange 22" as well as the flange 24" of the bevel gear 24. If the interface between the flange 22" and side plate 16, and the interface between the flange 24" and side plate 18 are both normal to the axis of the shafts 26 and 28, then the axis A of the pinion pin 50 is also maintained normal to the axis of the shafts 26 and 28 but is moved to the right of the central plane B of the ring gear 14 by the amount of tolerance build up which is indicated by the distance Y. It will be noted that distance Y as illustrated in FIG. 4 is the maximum permitted tolerance build up distance since the shaft 26 is in abutting engagement with the pinion pin 50. It will also be noted that the spring 58 and the length of the foot 60 maintains full and complete engagement with the slot even under these adverse conditions.

It will be appreciated that the forces acting on each pinion 42,44 will cause the axes of the pinions and thus the axis A of the pinion pin to lie midway between their points of engagement with the bevel gears. If one or both of the interfaces between the bevel gears 42,44 and their associated side plates 16,18 are not normal to the axis of the shafts 26,28, then the axis of each pinion and the associated end of the pinion pin 50 will reciprocate transversely of the ring gear 14 in response to rotation of one bevel gear relative to the other. The floating pinion pin 50 will permit this reciprocation, and frictional wear will be reduced to a minimum since the spring 58 will urge the feet 60 to the bottom of their slots 46,48 and the length of the flats 62,64 will provide maximum bearing contact with the sides of the slots at all times as indicated in FIG. 4.

A modified pinion pin 50' is illustrated in FIG. 7, which pin is the same as the pim 50 except that a sleeve 68 is substituted for the dowel 56, and the compression spring 58' is inserted in shallower bores in the inner end of the two sections of the pin 50'.

From the foregoing description it will be apparent that the preferred embodiment of the differential of the present invention includes a two-piece pinion pin having enlarged feet with flats that are longer than the pinion pin diameter and which ride in diametrically opposed slots in a carrier. The enlarged feet are urged fully into the slots at all times by a spring to provide for maximum bearing contact between the elongated flats and the sides of the slots and to compensate for tolerance build up axially of the pinion pin. The enlarged feet and spring of the floating pinion pin also compensates for tolerance build up and other variances in the gearing transversely of the pinion pin axis while maintaining maximum bearing contact between the sides of the slots and the elongated flats of the enlarged pinion pin feet.

Although the best mode contemplated for carrying out the present invention has been herein shown and described, it will be apparent that modification and variation may be made without departing from what is regarded to be the subject matter of the invention.

We claim:

1. In a differential having means defining a carrier mounted for rotation in a plane about a first axis, a pair of spaced bevel gears journaled in said carrier for differential movement relative to each other about said first axis, a shaft secured to each bevel gear, a pair of diametrically opposed pinions meshing with said bevel gears, and means defining a pair of diametrically opposed slots in said carrier extending transversely of the plane of rotation of said carrier; the improvement which comprises a floating pinion pin rotatably receiving said pinions and having elongated feet on opposite ends thereof that define flats which are longer than the diameter of said pinion pin and which are slidably received in said slots, said pinion pin including two sections with each section including one of said elongated feet on its outer end; said pinion pin additionally comprising means defining bores in the inner ends of each pinion pin section, a dowel disposed within said bores to maintain axial alignment of said sections, and a spring disposed between one end of said dowel and the bottom of one of said bores to maintain full bearing engagement of said feet within the associated slots at all times.

2. In a differential having means defining a carrier mounted for rotation in a plane about a first axis, a pair of spaced bevel gears journaled in said carrier for differential movement relative to each other about said first axis, a shaft secured to each bevel gear, a pair of diametrically opposed pinions meshing with said bevel gears, and means defining a pair of diametrically opposed slots in said carrier extending transversely of the plane of rotation of said carrier; the improvement which comprises a floating pinion pin rotatably receiving said pinions and having elongated feet on opposite ends thereof that define flats which are longer than the diameter of said pinion pin and which are slidably received in said slots, said pinion pin including two sections with each section including one of said elongated feet on its outer end; said pinion pin additionally comprising means defining bores in the inner ends of each pinion pin section, a sleeve disposed around portions of each pin section for maintaining axial alignment of said sections, and a spring disposed within said bores for maintaining full bearing engagement of said feet within the associated slots at all times.

3. In a differential having means defining a carrier mounted for rotation in a plane about a first axis, a pair of spaced bevel gears journaled in said carrier for differential movement relative to each other about said first axis, a shaft secured to each bevel gear, a pair of diametrically opposed pinions meshing with said bevel gears, and means defining a pair of diametrically opposed slots in said carrier extending transversely of the plane of rotation of said carrier; the improvement which comprises a floating pinion pin rotatably receiving said pinions and having elongated feet on opposite ends thereof that define flats which are longer than the diameter of said pinion pin and which are slidably received in said slots, said pinion pin including two sections with each section including one of said elongated feet on its outer end; said pinion pin additionally comprising means defining bores in the inner ends of each pinion pin section, means for maintaining axial alignment of said sections, and a spring disposed within at least one of said bores for maintaining full bearing engagement of said feet within the associated slots at all times.

4. An apparatus according to claim 3 wherein each slot is an open ended slot having side walls of a predetermined length, and wherein the length of the flats on said feet are longer than said slots by a distance which will assure full engagement between said flats and sides of said slots even when said pinion pin is induced to float transversely the maximum amount.

5. An apparatus according to claim 3 wherein each foot is integrally formed on its pinion pin section.

* * * * *